(12) United States Patent
Clary

(10) Patent No.: US 8,074,950 B2
(45) Date of Patent: Dec. 13, 2011

(54) WALL AFFIXED VERTICALLY ARTICULATED FLAT PANEL DISPLAY MOUNT

(76) Inventor: David Michael Clary, Smyrna, GA (US)

( * ) Notice: Subject to any disclaimer, the term of this patent is extended or adjusted under 35 U.S.C. 154(b) by 930 days.

(21) Appl. No.: 12/078,082

(22) Filed: Mar. 27, 2008

(65) Prior Publication Data

US 2008/0237424 A1 Oct. 2, 2008

Related U.S. Application Data

(60) Provisional application No. 60/921,495, filed on Mar. 28, 2007.

(51) Int. Cl.
*E04G 3/00* (2006.01)
(52) U.S. Cl. ........... 248/280.11; 248/281.11; 248/284.1; 248/276.1; 361/679.02; 473/483; 473/484
(58) Field of Classification Search ............... 248/279.1, 248/274.1, 284.1, 291.1, 292.11, 294.1, 280.11, 248/281.11, 123.11, 124.1, 917, 918, 919, 248/920, 921, 922, 923, 201, 297.11, 324, 248/205.1, 276.1, 278.1, 285.1, 495, 225.11, 248/225.21; 473/484, 483; 361/679.02
See application file for complete search history.

(56) References Cited

U.S. PATENT DOCUMENTS

| | | | | |
|---|---|---|---|---|
| 2,737,920 A * | 3/1956 | Heath | ..................... | 440/61 R |
| 3,236,556 A * | 2/1966 | Lathers | ..................... | 296/65.08 |
| 3,490,727 A * | 1/1970 | Miller | ..................... | 248/284.1 |
| 3,586,324 A * | 6/1971 | Bearson | ..................... | 473/484 |
| 3,667,714 A * | 6/1972 | Ziaylek, Jr | ..................... | 248/284.1 |
| 3,765,676 A * | 10/1973 | Bearson et al. | ..................... | 473/484 |
| 3,802,702 A * | 4/1974 | Pulley | ..................... | 473/484 |
| 3,970,304 A * | 7/1976 | Ebstein et al. | ..................... | 473/481 |
| 3,990,660 A * | 11/1976 | Pipoz | ..................... | 248/642 |
| 4,005,860 A * | 2/1977 | Ebstein et al. | ..................... | 473/481 |
| 4,330,101 A * | 5/1982 | Andersen | ..................... | 248/284.1 |
| 4,395,040 A * | 7/1983 | White | ..................... | 473/484 |
| 4,781,375 A * | 11/1988 | Nye | ..................... | 473/484 |
| 4,844,387 A * | 7/1989 | Sorgi et al. | ..................... | 108/5 |
| 4,861,292 A * | 8/1989 | Griffiths et al. | ..................... | 440/1 |
| 4,890,811 A * | 1/1990 | Ehni | ..................... | 248/642 |
| 5,058,846 A | 10/1991 | Close | ..................... | 248/292.1 |
| 5,108,063 A * | 4/1992 | Koerber et al. | ..................... | 248/284.1 |
| 5,186,666 A * | 2/1993 | Stanley | ..................... | 440/61 R |
| 5,738,316 A * | 4/1998 | Sweere et al. | ..................... | 248/123.11 |
| 5,842,672 A * | 12/1998 | Sweere et al. | ..................... | 248/278.1 |
| 5,918,841 A * | 7/1999 | Sweere et al. | ..................... | 248/123.11 |
| 6,886,701 B2 * | 5/2005 | Hong et al. | ..................... | 211/99 |
| 6,923,413 B2 | 8/2005 | Dozier | ..................... | 248/294.1 |
| 7,300,029 B2 * | 11/2007 | Petrick et al. | ..................... | 248/285.1 |
| D565,054 S * | 3/2008 | Anderson et al. | ..................... | D14/452 |
| 7,345,870 B2 * | 3/2008 | Shin | ..................... | 361/679.27 |
| 7,448,584 B2 * | 11/2008 | Chen et al. | ..................... | 248/278.1 |
| 7,510,156 B1 * | 3/2009 | Yaeger | ..................... | 248/284.1 |
| 7,537,189 B2 * | 5/2009 | Jung et al. | ..................... | 248/298.1 |
| 7,546,745 B2 * | 6/2009 | Lee et al. | ..................... | 62/125 |
| 2002/0033436 A1 * | 3/2002 | Peng et al. | ..................... | 248/284.1 |
| 2004/0021051 A1 * | 2/2004 | Chiu | ..................... | 248/371 |
| 2004/0084587 A1 * | 5/2004 | Oddsen | ..................... | 248/284.1 |
| 2005/0152102 A1 * | 7/2005 | Shin | ..................... | 361/681 |

(Continued)

*Primary Examiner* — Kimberly Wood

(57) ABSTRACT

A wall affixed vertically articulated flat panel display mount having a first frame assembly secured to a wall and a second frame assembly operatively connected to the back of a flat panel display. Two pairs of horizontally spaced parallel links extend between the first and second frame assemblies and have respective ends pivotally connected thereto. A pair of pneumatic springs and a linear actuator are connected between the first and second frame assemblies. Knob clamps are provided for holding the mount in a desired position.

2 Claims, 4 Drawing Sheets

U.S. PATENT DOCUMENTS

| | | | |
|---|---|---|---|
| 2007/0007413 A1* | 1/2007 | Jung et al. | 248/284.1 |
| 2007/0023599 A1* | 2/2007 | Fedewa | 248/284.1 |
| 2007/0221807 A1* | 9/2007 | Park | 248/324 |
| 2007/0272815 A1* | 11/2007 | Chueh | 248/326 |
| 2009/0050763 A1* | 2/2009 | Dittmer | 248/284.1 |

* cited by examiner

WALL AFFIXED VERTICALLY ARTICULATED FLAT PANEL DISPLAY MOUNT

CROSS REFERENCE TO RELATED APPLICATION

This application claims the benefit of Provisional Patent Application Ser. No. 60/921,495 filed Mar. 28, 2007.

BACKGROUND OF THE INVENTION

Flat screen displays, such as plasma televisions, are customarily mounted at a fixed position on a wall. In some instances, the flat screen display is fixed at a height too high for a particular viewer.

After considerable research and experimentation, the display mount of the present invention has been devised whereby the flat panel display can be lowered to a more ergonomic viewing height which is more suitable for extended watching; such as, movies, sports events, or playing video games.

SUMMARY OF THE INVENTION

The wall affixed vertically articulated flat panel display mount of the present invention comprises, essentially, a first frame assembly secured to a wall and a second frame assembly operatively connected to the back of a flat panel display. Two pairs of horizontally spaced parallel links extend between the first and second frame assemblies and have respective ends pivotally connected thereto, whereby the flat panel display can be moved away from the wall to a lower position while being maintained in a vertical orientation relative to the wall. A pair of pneumatic springs are connected between the first and second frame assemblies to provide an offsetting force to the gravitational downward pull by the weight of the flat panel display, whereby the flat panel display weight is substantially negated, thereby allowing for manual movement of the flat panel display upward and downward.

A linear drive can also be provided between the first and second frame assemblies to allow for automatic lowering and lifting of the flat panel display.

DETAILED DESCRIPTION OF THE PREFERRED EMBODIMENT

Figures 3, 4:
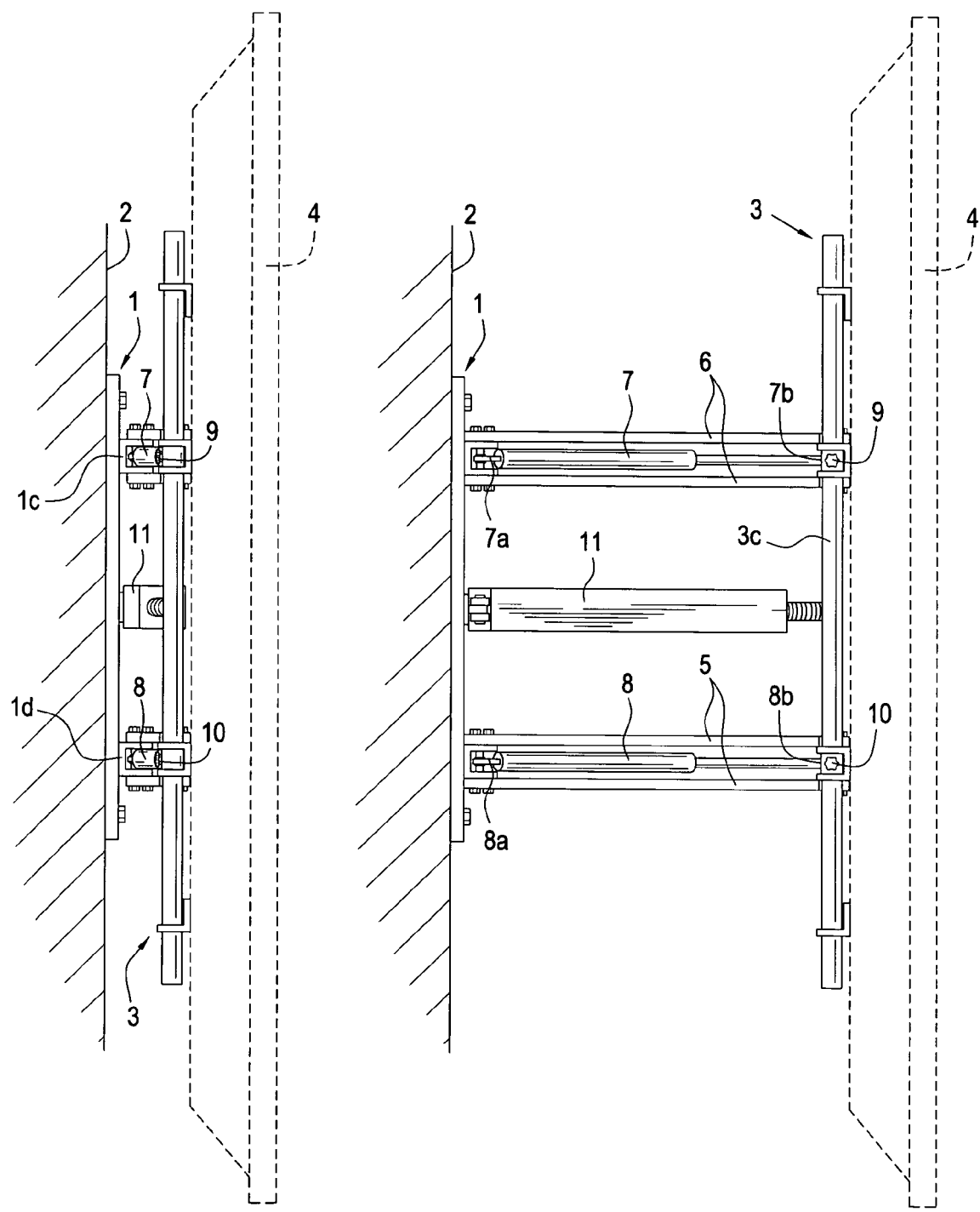
FIG. 3 is a top plan view of the mount shown in FIG. 1.
FIG. 4 is a top plan view of the mount shown in FIG. 2.

Referring to the drawings, and more particularly to FIGS. 3 and 4, the wall affixed vertically articulated flat panel display mount of the present invention comprises a first frame assembly 1 secured to a wall 2 and a second frame assembly 3 operatively connected to the back of a flat panel display 4.

Figure 1:
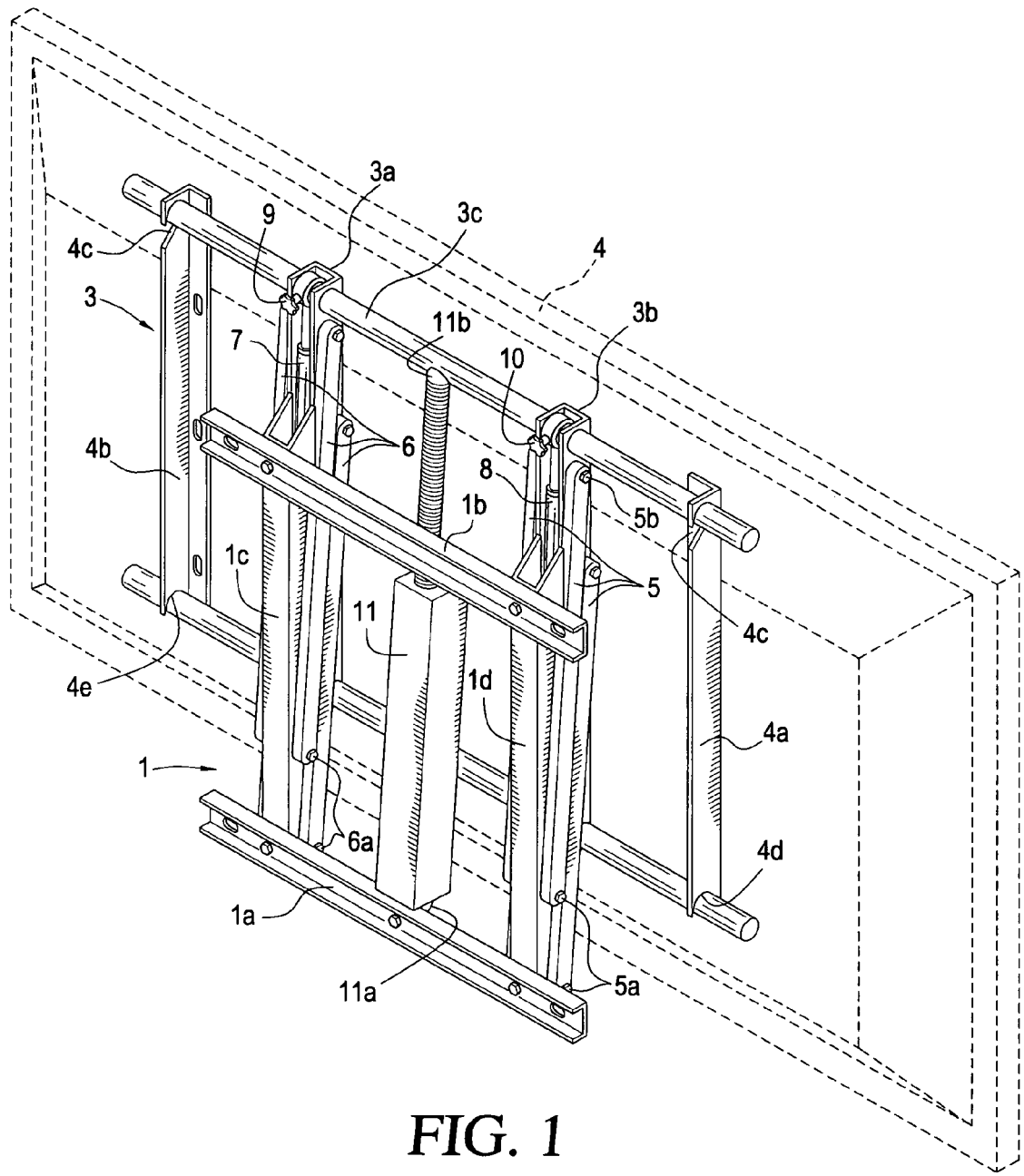
FIG. 1 is a perspective view of the wall affixed vertically articulated flat panel display mount of the present invention shown in the raised position.
Figure 2:
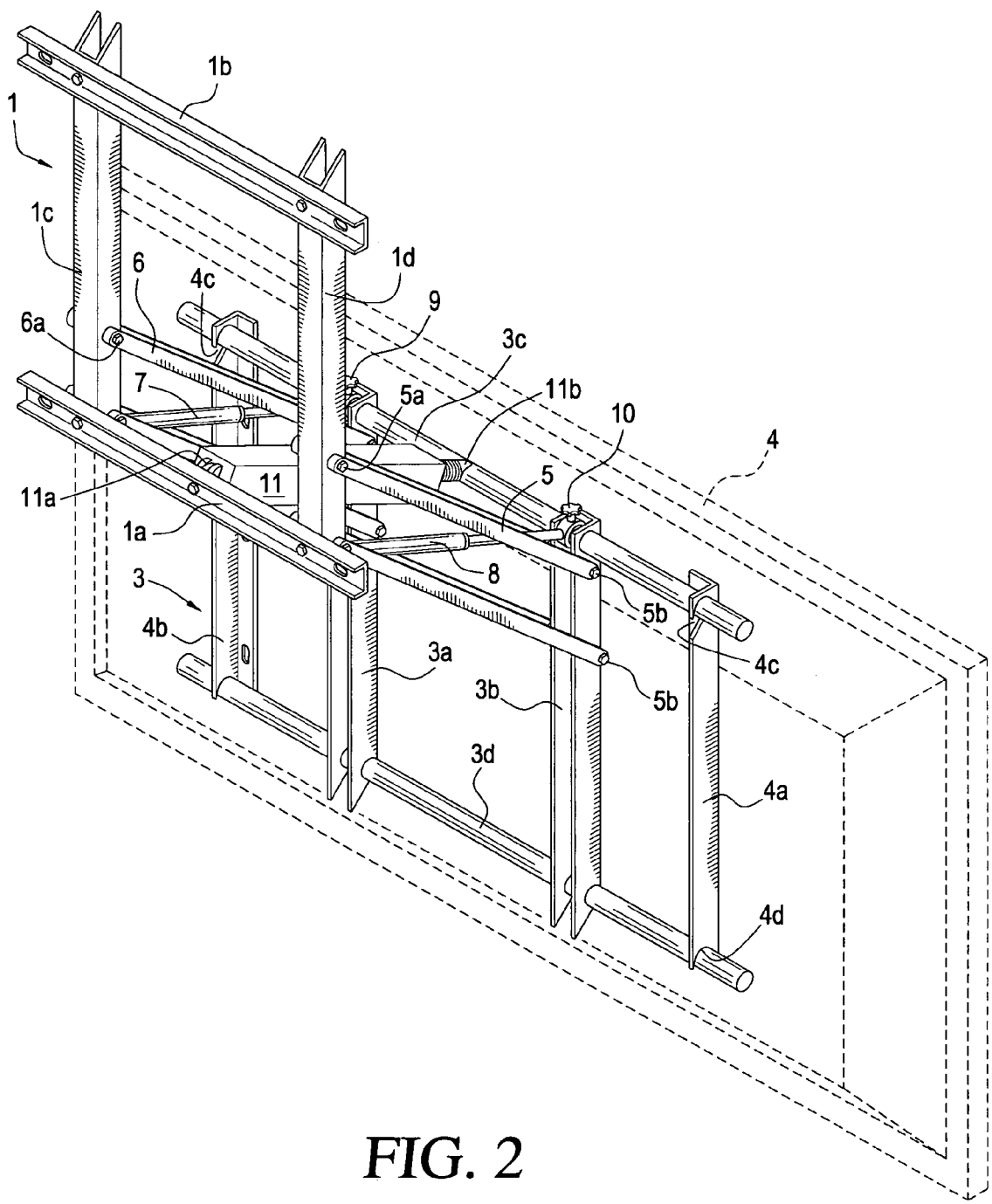
FIG. 2 is a perspective view of the mount shown in FIG. 1 moved to a lowered position.

The details of the construction of the frame assemblies 1 and 3 are illustrated in FIGS. 1 and 2, wherein it will be seen that the first frame assembly 1 comprises a pair of horizontally extending, vertically spaced channels 1a, 1b secured to the wall 2 by suitable bolts, and a pair of vertically extending, horizontally spaced channels 1c and 1d secured to the horizontal channels 1a and 1b.

The second frame assembly 3 comprises a pair of vertically extending, horizontally spaced channels 3a, 3b having horizontally extending, vertically spaced tubes 3c, 3d extending therethrough. A pair of vertically extending, horizontally spaced angle irons 4a and 4b are secured to the back of the flat screen display 4. The upper end of each angle iron 4a and 4b has a hooked portion as at 4c for receiving the upper tube 3c, and the lower end of each angle iron 4a and 4b is notched as at 4d for engaging the tube 3d.

The frame assemblies 1 and 3 are vertically articulated relative to each other by means of two pairs of horizontally spaced, parallel links 5 and 6 having respective ends pivotally connected to the lower end portions of channels 1c and 1d as at 5a and 6a, and to the upper end portions of channels 3a and 3b as at 5b and 6b, respectively.

As will be seen in FIGS. 3 and 4, a pair of pneumatic springs 7 and 8 extend between the first and second frame assemblies 1 and 3 and have respective ends pivotally connected to the channels 1c and 1d as at 7a and 8a, and to the tube 3c as at 7b and 8b. By this construction and arrangement, the pneumatic springs 7 and 8 provide an offsetting force to the gravitational downward pull by the weight of the flat panel display 4, whereby the flat panel display weight is substantially negated, thereby allowing for manual movement of the flat panel display upward and downward. The position of the flat screen display 4 can be fixed at the desired height by a pair of knob clamps 9 and 10 provided at the point where the pneumatic springs 7 and 8 are connected to the tube 3c.

While the flat panel display mount of the present invention has been described for manual adjustment to a desired height, a linear actuator 11 can be provided for articulating the display mount. The linear actuator 11 has one end pivotally connected to the wall channel 1a as at 11a and the opposite end connected to the tube 3c as at 11b. A remote control (not shown) may be used to actuate the linear actuator 11.

Figure 5:
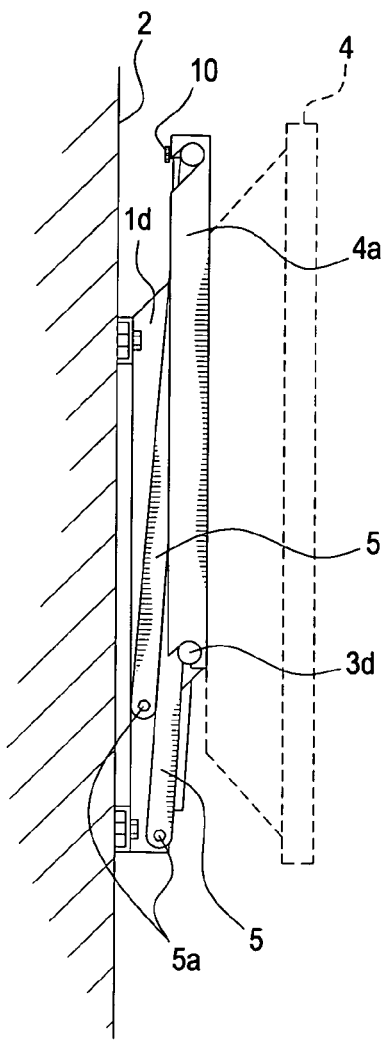
FIG. 5 is a side elevational view of the mount shown in FIG. 1.
Figure 6:
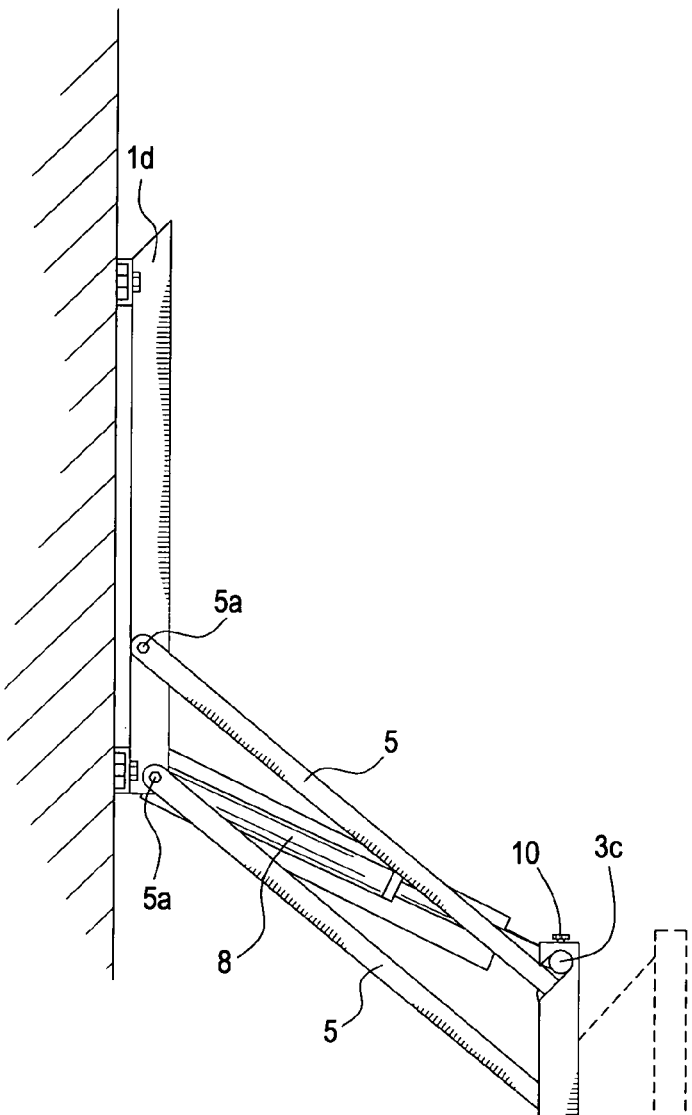
FIG. 6 is a side elevational view of the mount shown in FIG. 2.

As will be seen in FIGS. 5 and 6, by pivotally connecting the links 5 and 6 to the lower end portions of their respective channels 1c and 1d, the flat panel display frame is provided with a vertical mobility whereby it can travel from a raised position flat against the wall frame 1, to an extended position the full length of the linkage arms away from the wall, to a lowered position back flat against the wall 2 below the wall frame 1, while maintaining a perpendicular orientation to the wall and wall frame throughout the travel path.

It is to be understood that the form of the invention herewith shown and described is to be taken as a preferred example of the same, and that various changes in the shape, size, and arrangement of parts may be resorted to without departing from the spirit of the invention or scope of the subjoined claims.

I claim:

1. A wall affixed vertically articulated flat panel display mount comprising:

a first frame assembly secured to the wall and a second frame assembly operatively connected to the back of the flat panel display;

two pairs of horizontally spaced parallel links extending between said first frame assembly and said second frame assembly and having respective ends pivotally connected thereto;

wherein said second frame assembly comprises a pair of vertically extending, horizontally spaced channels, and a pair of horizontally extending, vertically spaced tubes extending through said channels;

a pair of telescopic pneumatic springs connected between said first frame assembly and said second frame assembly to provide an offsetting force to the gravitational downward pull by the weight of the flat panel display, whereby the flat panel display weight is substantially negated, thereby allowing for manual movement of the flat panel display upward and downward;

pair of vertically extending, horizontally spaced angle irons are secured to the back of the flat panel display, the upper end of each angle iron having a hook portion for receiving the upper tube of the horizontally extending, vertically spaced tubes, and the lower end of each angle iron being notched for receiving the lower tube; and whereby the flat panel display can be moved away from the wall to a lower position while being maintained in a vertical orientation relative to the wall.

2. A wall affixed vertically articulated flat panel display mount comprising:

a first frame assembly secured to the wall and a second frame assembly operatively connected to the back of the flat panel display;

two pairs of horizontally spaced parallel links extending between said first frame assembly and said second frame assembly and having respective ends pivotally connected thereto;

wherein said second frame assembly comprises a pair of vertically extending, horizontally spaced channels, and a pair of horizontally extending, vertically spaced tubes extending through said channels;

a pair of telescopic pneumatic springs connected between said first frame assembly and said second frame assembly to provide an offsetting force to the gravitational downward pull by the weight of the flat panel display, whereby the flat panel display weight is substantially negated, thereby allowing for manual movement of the flat panel display upward and downward;

wherein said telescopic pneumatic springs each include a cylinder portion and a rod portion, the end of the rod portion being connected to the upper tube of the pair of vertically spaced, horizontally extending tubes;

wherein a pair of knob clamps are provided at each connection of said rod ends to said tube, whereby the flat panel display can be fixed at a desired height; and whereby the flat panel display can be moved away from the wall to a lower position while being maintained in a vertical orientation relative to the wall.

\* \* \* \* \*